No. 771,651. PATENTED OCT. 4, 1904.
E. S. LEA.
WHEEL.
APPLICATION FILED JAN. 16, 1904.
NO MODEL.
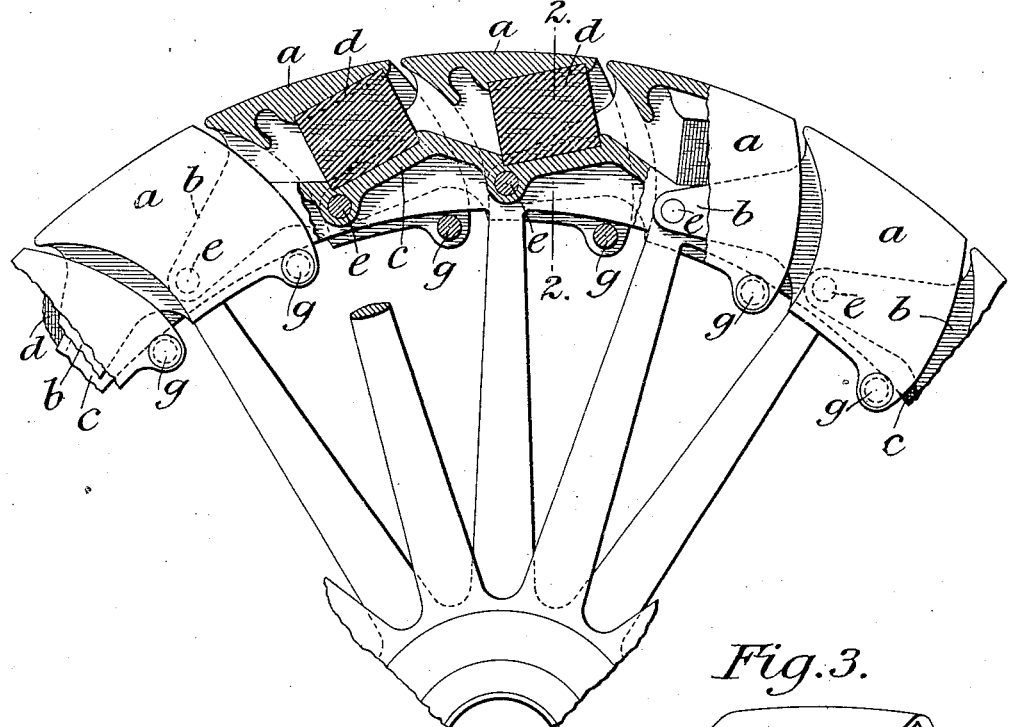
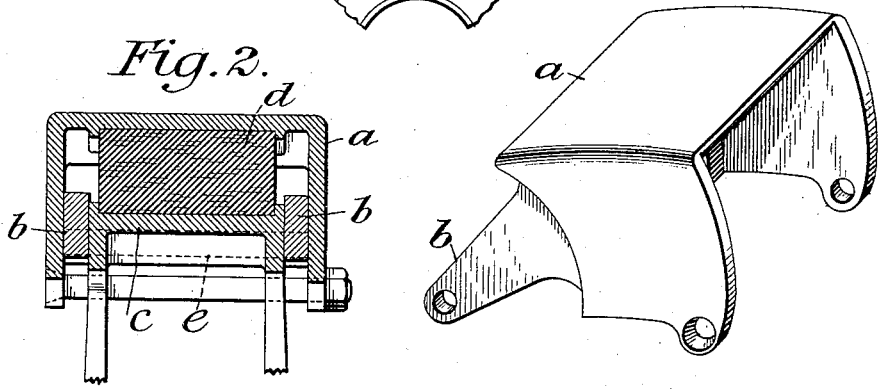
Attest:
A. N. Jesbera
Lucius E. Varney
Inventor:
Edward S. Lea
by Redding Kiddle & Greeley
Attys.

No. 771,651.

Patented October 4, 1904.

UNITED STATES PATENT OFFICE.

EDWARD S. LEA, OF RUTHERFORD, NEW JERSEY.

WHEEL.

SPECIFICATION forming part of Letters Patent No. 771,651, dated October 4, 1904.

Application filed January 16, 1904. Serial No. 189,293. (No model.)

*To all whom it may concern:*

Be it known that I, EDWARD S. LEA, a citizen of the United States, residing at Rutherford, in the county of Bergen and State of New Jersey, have invented certain new and useful Improvements in Wheels, of which the following is a specification, reference being had to the accompanying drawings, forming a part hereof.

This invention relates to wheels, and while its application is general it is more particularly concerned with wheels employed upon motor-vehicles of the heavier type. In such vehicles, as is well known, the usual rubber tire is quickly worn away and has frequently to be replaced.

The object of this invention is to provide a tire which shall possess all the desirable characteristics of rubber tires and one which will satisfactorily withstand the attacks which are caused by heavy loads and rough pavements and which quickly destroy rubber tires.

The invention is illustrated in and will be described with reference to the accompanying drawings, in which—

Figure 1 is a view, partly in side elevation and partly in section, of a portion of a wheel embodying the invention. Fig. 2 is a sectional view taken on the plane indicated by the line 2 2 in Fig. 1, and Fig. 3 is a perspective view of one of the sections or shoes of which the tire is composed.

Each of the sections or shoes $a$ which make up the tire is substantially box-shaped, as shown particularly in Fig. 3, and has at one end two projections or extensions $b$, from which it is pivoted in the rim $c$, a rod or pin $e$ being provided for this purpose and extending through both projections and the rim. The inside of each shoe and the rim are preferably formed so as to receive and hold some means, such as a block of rubber $d$, for cushioning the shoe against the rim, whereby the resilient effect of a rubber tire may be obtained, the shoe being fastened to the rim in such a manner as will permit it to swivel about its pivot-rod $e$. The means for fastening each shoe to the rim, so that this swiveling may take place, is preferably a rod or bolt $g$, which extends through each side of the shoe at the end opposite that from which it is pivoted, this rod or bolt being normal to the plane of the wheel and resting freely upon the inner side of the rim $c$. The sections or shoes are so arranged with reference to each other that the projections or extensions $b$ upon one shoe enter the shoe next thereto, within which they are pivoted to the rim, as just described. It will thus be seen that each shoe is independent of every other shoe and that each can swivel in the plane of the wheel, being pivoted at one end and having a certain freedom of movement at the other end.

In assembling the parts of the wheel the several sections or shoes are placed upon the wheel-rim successively, each section being secured to the rim by its pivot-pin, the cushioning devices being then inserted between the rim and the sections, and, lastly, the sections being forced down against the pressure of the cushioning devices until the bolts $g$ can be inserted in their respective sections, as above described. As soon as one section is in place, the next section, which covers the pivot of the first section, is secured to the rim in like manner, and so on with the succeeding sections. When the last section is to be placed upon the rim, the bolt $g$ of the first section is removed to uncover the pivot-holes for the last section, which are covered by the first section. The last section is then secured to the rim by its pivot-pin and both the first and the last sections are forced against the pressure of their respective cushioning devices until the pins $g$ can be inserted, as above described.

It will be noted that the rods $e$ may be simply pins without any fastening means whatever, they being held in place by the sides of the shoe within which they lie. For this reason and because the shoes are independent each shoe is readily detachable, the bolts of two sections or shoes having only to be withdrawn to remove a shoe. In this way any shoe can be removed and replaced when broken or for any other reason.

It will be obvious that the thickness and other dimensions of the shoe, as well as the shape of the shoe, may be varied in different ways without departing from the invention, which is not limited to the precise form shown and described.

I claim as my invention—

1. In a wheel, a tire comprising a plurality of sections pivoted directly to the rim of the wheel, each section being independent of the other sections, and means to cushion each section against the rim.

2. In a wheel, a tire comprising a plurality of sections each section being pivoted at one end directly to the rim of the wheel and having a certain freedom of movement with respect to the rim at the other end, and means to cushion each section at its free end against the rim.

3. In a wheel, a tire comprising a plurality of sections, each section being pivoted at one end directly to the rim of the wheel and having a certain freedom of movement with respect to the rim at the other end, and means to cushion each section at its free end against the rim, each section being independent of the other sections.

4. In a wheel, a tire comprising a plurality of sections pivoted directly to the rim so as to be movable in the plane of the wheel, each section being independent of the other sections.

5. In a wheel, the combination with the rim, of a plurality of shoes pivoted directly thereto, each shoe being independent of the other shoes, and means to cushion the shoes against the rim.

6. In a wheel, the combination with the rim, of a plurality of box-shaped shoes, rods extending through the rim normal to the plane of the wheel, and upon which the shoes are pivoted at one end, and means within the shoes to cushion them against the rim.

7. In a wheel, the combination with the rim, of a plurality of box-shaped shoes, rods extending through the rim normal to the plane of the wheel and upon which the shoes are pivoted at one end, rods extending through the sides of the shoes and resting freely upon the inner side of the rim, and means within the shoes to cushion them against the outside of the rim.

8. In a wheel, the combination with the rim, of a plurality of box-shaped shoes having extended portions, rods extending through the rim upon which the shoes are pivoted at their extended portions, the extended portions upon each shoe lying within one of the adjacent shoes, and means within each shoe to cushion it against the rim.

9. In a wheel, the combination with the rim, of a plurality of box-shaped shoes pivoted thereto at one end, each shoe being independent of the others, and a block of rubber between each shoe and the rim at the other end.

This specification signed and witnessed this 13th day of January, A. D. 1904.

EDWARD S. LEA.

In presence of—
GEO. R. REMINGTON,
GEO. D. TALLMAN.